United States Patent [19]

Barozzi et al.

[11] 4,037,774
[45] July 26, 1977

[54] PROCESS FOR THE SOLDERING OF THE COOLER ASSEMBLY TO AUTOMOBILE RADIATORS

[75] Inventors: Dan Alexandru Barozzi; Valentin Calin, both of Brasov; Zsigmond Peter, Prejmer, all of Romania

[73] Assignee: Intreprinderea De Radiatoare Si Cabluri, Brasov, Romania

[21] Appl. No.: 612,804

[22] Filed: Sept. 12, 1975

[51] Int. Cl.² .............................................. B23K 1/02
[52] U.S. Cl. ................................... 228/183; 228/206; 228/214; 228/242
[58] Field of Search ............... 228/200, 206, 183, 207, 228/214, 242; 204/33

[56] References Cited

U.S. PATENT DOCUMENTS

| | | | |
|---|---|---|---|
| 2,791,553 | 5/1957 | Connor et al. | 204/33 |
| 3,631,588 | 1/1972 | Barozzi | 228/200 |

Primary Examiner—Al Lawrence Smith
Assistant Examiner—K. J. Ramsey
Attorney, Agent, or Firm—Karl F. Ross; Herbert Dubno

[57] ABSTRACT

An improved method is disclosed for the soldering together of the cooling assembly of automobile radiators wherein aluminum fins, a first part of the cooling assembly, are etched in a solution consisting essentially of 10 to 14% sodium hydroxide, 4 to 7% zinc cyanide, 20 to 30% technical urea with the balance water for a period of 15 to 30 seconds at a temperature of 32° to 60° C prior to undergoing treatment with a protective coating and eventual soldering to cooling pipes made of copper, brass, steel or aluminum, the remainder of the cooling assembly.

2 Claims, No Drawings

PROCESS FOR THE SOLDERING OF THE COOLER ASSEMBLY TO AUTOMOBILE RADIATORS

The present invention refers to a process for the soldering of the cooler assembly to automobile radiators and is a related application to the prior application U.S. Ser. No. 28,968 now U.S. Pat. No. 3,631,588 and to copending application U.S. Ser. No. 612,805.

According to the prior application for the soldering of the cooler assembly to automobile radiators a thermal etching bath is used consisting of 98% mineral oil and 2% etching mixture containing 60% stearins, 20% ammonium bromide, 10% glycerin, and 10% concentrated ammonia to etch the metal fins where the metal is aluminum.

Next the metal fins which may be copper, brass, steel or aluminum are mounted on supporting cooling tubes.

The aluminum fins are etched before fitting at 20°-30° C for 1-5 minutes in a bath of: 40% nitric acid $d = 1.40$ g/cm$^3$, 2% hydrogen fluoride, 38% concentration, balance water immersed for 30 seconds to obtain a protective film in a bath of 5 - 15% stearine, 2% ammonium bromide and 95-93% technical alcohol.

The cooling tubes are coated, before fitting with the fins, by usual thermal methods with an easily fusible alloy film with a thickness of 0.04 mm consisting of 46% Sn, 15% Zn, 15% Cd, 23% Pb, or 40% Sn and 60% Pb or with two successive films of easily fusible soldering alloy, the first film consisting of 40% Sn and 60% Pb, the second one of 51% Sn, 16.2% Zn, 16.2 % Cd, and 16.6% Pb. Then in the case of the solder with copper, brass or steel fins which can be mounted unetched, these are coated with a protective film in a bath of 20% stearins, 40% paraffin oil, 18% paraffin, 2% ammonium bromide, and 20% diesel oil.

The thus prepared cooler assembly is kept for 5-10 minutes in the thermal etching bath heated to temperatures between 260°-300° C for the purpose of the melting of the fusable alloy and the soldering of the fins to the cooling tubes can take place. Then the soldered assembly is cooled down in an horizontal position with an air jet and washed with a suitable ordinary solvent.

The copending invention which contains the assemblies soldered during immersion in the etching bath at 250°-300° C, in the manner described in the mentioned related application, in order to simplify the process, uses as etching mixture for the respective bath of technical stearins, added by the known manner in a ratio of 2%, for the preliminary etching of the aluminum fins which includes 38% hydrogen fluoride in solution with a concentration of 5-10%, and for the building of the subsequent protective film a bath of ethylene trichloride with 10-30% technical stearins, in which the fins are maintained for 30-60 seconds, at 30°-40° C. For the building of the protective film on the cooling supports, covered with a film of the already known easily fusible alloy with a thickness of 0.03 - 0.05 mm, before fitting with the copper, brass, or steel fins an ethylene trichloride bath is used with additional 10-20% technical stearins which the supports are kept in for 30-60 seconds at 30°-40° C, the assembly thus prepared is then kept in the abovementioned thermal etching bath for 20-120 seconds.

The method described in the related application as well as the copending application has some shortcomings linked to the necessity of protection of the assembly from acids. The present application discloses the assembly's soldering which takes place during the assembly's immersion in a thermal etching bath in the manner described in the mentioned related prior and copending applications and which eliminates prior art disadvantages by pretreating the aluminum fins before their mounting by their immersion in an alkaline bath containing 10-14% sodium hydroxide, 4-7% zinc cyanide and 20-30% urea for 15-30 seconds at 32°-60° C, followed by protection through immersion in an alcoholic or ethylene trichloride bath which also contains 10-30% technical stearine.

The following examples are two practical applications of the invention:

1. According to the invention for the soldering of the aluminum pine on support elements made of copper, brass, steel or aluminum from which the automobile radiators are made ths removal of the superficial oxide film and the creation of the respective soldering conditions must be set up before soldering. For this purpose, the aluminum surface is treated previously for 15-30 seconds at 32°-60° C in a solution with the following composition: 10-20% sodium hydroxide 4-7% zinc cyanide, (55-60% Zn), 20-30% urea and the rest water. The pretreated surface is rinsed in a bath of running water for 1 minute, is dried up, after which, for protection, the aluminum surface is immersed for 15-30 seconds at 30°-40° C in the bath containing a protective solution of 10-30% stearine and 70-90% ethylene chloride or technical alcohol.

On the aluminum surface a protective solder-receptive film is formed, with a thickness between 2-4 microns, thus preventing the aluminum surfaces reoxidation.

The support material copper, brass, steel and aluminum is coated thermally by usual methods with a binary easily meltable alloy based on Sn and Pb or with a gusternary alloy with or without a Sn base with a minimum thickness between 8.03-0.05 mm.

On the support elements thus prepared, the aluminum fins treated in the above manner are mounted, and then, the entire assembly is introduced for soldering in a thermal etching bath consisting of 98% mineral oil and 2% etching mixture, made of technical stearine.

The mineral oil, used in the above purpose must have the following characteristics: flash point minimum 315° C, viscosity at 100° C 45-65 c St and 5.98°-8.58° E organic acidity minimum 0.10 mg KOH/gr. maximum; + 10° C maximum freezing point, 0.03% maximum mechanical impurities, water-free.

The assembly meant for soldering is maintained for 20-120 seconds in this medium depending on the dimensions and its construction type at a temperature between 250°-270° C, period of time so that the alloys on the metal of the support melt and the superimposed aluminum fin surfaces are soldered together.

After removal from the etching bath the soldered assembly is cooled down in an air jet for the purpose of cooling and solidifying the alloy to be soldered at at the joints as well as the removal and recovery of the thermal etching liquid medium.

The complete cleaning of the soldered assembly is accomplished by immersing it into a bath containing a suitable solvent as for example ethylene trichloride or another ordinary solvent.

2. On the metallic elements of the support made of copper, brass, or steel covered with a coating of binary soldering alloy of Sn and Pb and protected by prior immersion in a solution formed of 10–20% technical stearine and 80–90% ethylene trichloride the fins made of copper, brass, or steel are mounted in an unetched state.

The assembly thus prepared is introduced for soldering in the stearins bath with the same composition from example 1. The assembly meant for soldering is kept in that medium for 20–120 seconds at a temperature between 260°–300° C, a time period during which the surfaces are etched, the easily fusible alloy melts and the assembly's parts are soldered together.

After taking the assembly out of the etching bath it is treated as in example 1.

The present invention has the advantage of simplifying the process and eliminating the measures taken for the anticorrosive protection of the product.

We claim:

1. In a process for soldering aluminum fins to cooling pipes made of aluminum, brass, steel, or copper to produce a cooling assembly for car radiators wherein the aluminum fins are etched and provided with a protective coating, wherein the cooling pipes are coated with solder, and where the aluminum fins are then mounted upon and soldered to the cooling pipes in a thermal bath, the improvement wherein:
   a. the aluminum fins are etched for a period of 15 to 30 seconds at a temperature of 32° to 60° C in a solution which consists essentially of 10 to 14% sodium hydroxide, 4 to 7% zinc cyanide, 20 to 30% technical urea with the balance water; to prevent subsequent electrocorosion thereon;
   b. the aluminum fins are then rinsed with running water for one minute;
   c. the protective coating has a thickness of 2 to 4 microns and is applied by immersing the fins after etching in a bath which consists essentially of 10 to 30% technical stearine with 80 to 90% ethylene trichloride for 30 to 60 seconds at a temperature of 30° to 40° C; and
   d. the thermal bath used during soldering consists essentially of 98% mineral oil having the following physical constants: minimum flash point 315° C and viscosity at 100° C of 45 to 65 cSt and 2% technical stearine.

2. The improvement defined in claim 1 wherein the solder is a binary composition consisting essentially of tin and lead.

* * * * *